(12) United States Patent
Baek et al.

(10) Patent No.: US 11,799,192 B2
(45) Date of Patent: Oct. 24, 2023

(54) ELECTRONIC DEVICE INCLUDING SENSOR

(71) Applicant: SAMSUNG ELECTRONICS CO., LTD., Suwon-si (KR)

(72) Inventors: Seunggeol Baek, Suwon-si (KR); Jeonghoo Kim, Suwon-si (KR); Kemsuk Seo, Suwon-si (KR); Kwangsub Lee, Suwon-si (KR); Junkyu Park, Suwon-si (KR); Duckho Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 16/925,641

(22) Filed: Jul. 10, 2020

(65) Prior Publication Data

US 2021/0044684 A1 Feb. 11, 2021

(30) Foreign Application Priority Data

Aug. 7, 2019 (KR) ........................ 10-2019-0096029

(51) Int. Cl.
*H04M 1/02* (2006.01)
*H01Q 1/24* (2006.01)

(52) U.S. Cl.
CPC .......... *H01Q 1/243* (2013.01); *H04M 1/0266* (2013.01); *H04M 1/0274* (2013.01); *H04M 1/0277* (2013.01); *H04M 2250/12* (2013.01)

(58) Field of Classification Search
CPC ............. H04M 1/0266; H04M 1/0274; H04M 1/0277; H04M 2250/12; H04M 1/026;

(Continued)

(56) References Cited

U.S. PATENT DOCUMENTS 9,131,037 B2 9/2015 Corbin et al.
9,479,006 B2 10/2016 Kim et al.
(Continued)

FOREIGN PATENT DOCUMENTS

EP 3 392 961 10/2018
KR 10-2019-0135294 A 12/2010
(Continued)

OTHER PUBLICATIONS

Extended Search Report and Written Opinion dated Jul. 11, 2022 in counterpart European Patent Application No. 20850976.0.
(Continued)

*Primary Examiner* — Anthony Q Edwards
*Assistant Examiner* — Hung Q Dang
(74) *Attorney, Agent, or Firm* — Nixon & Vanderhye P.C.

(57) ABSTRACT

An electronic device includes: a display, an antenna structure including at least one antenna, a conductive support disposed between the display and the antenna structure, a sensor disposed between the display and the conductive support, a first printed circuit board disposed between the conductive support and the antenna structure, a second printed circuit board stacked on the first printed circuit board, a board support coupled with the conductive support and overlapping at least part of the second printed circuit board, and a first insulating member comprising an insulating material disposed between the board support and the antenna structure.

20 Claims, 9 Drawing Sheets

(58) Field of Classification Search
CPC ..... H04M 1/0249; H01Q 1/243; G06V 40/13; H02J 50/005; H02J 50/10; H04B 5/0075
See application file for complete search history.

(56) References Cited

U.S. PATENT DOCUMENTS

| | | | |
|---|---|---|---|
| 9,888,561 B2 | 2/2018 | Perkins et al. | |
| 9,972,892 B2 | 5/2018 | Noori et al. | |
| 10,249,972 B1 | 4/2019 | Lim et al. | |
| 10,261,549 B2 | 4/2019 | Han et al. | |
| 10,305,172 B2 | 5/2019 | Noori et al. | |
| 10,674,607 B2 | 6/2020 | Park et al. | |
| 10,705,576 B2 | 7/2020 | Han et al. | |
| 10,726,258 B2 | 7/2020 | Park et al. | |
| 10,734,705 B2 | 8/2020 | Choi et al. | |
| 2011/0025575 A1 | 2/2011 | Niederkorn et al. | |
| 2012/0286727 A1 | 11/2012 | Kim et al. | |
| 2014/0112511 A1 | 4/2014 | Corbin et al. | |
| 2014/0232607 A1* | 8/2014 | Lee ................. | H04B 15/04 343/841 |
| 2014/0355194 A1* | 12/2014 | Shiraishi ............ | G06F 1/1637 361/679.26 |
| 2015/0181772 A1* | 6/2015 | Ady ................... | H05K 9/0032 361/752 |
| 2017/0027058 A1 | 1/2017 | Perkins et al. | |
| 2017/0045918 A1 | 2/2017 | Han et al. | |
| 2017/0309992 A1 | 10/2017 | Noori et al. | |
| 2018/0233808 A1* | 8/2018 | Noori .................. | H01Q 1/241 |
| 2019/0012544 A1* | 1/2019 | Park .................... | G06V 10/147 |
| 2019/0027807 A1 | 1/2019 | Choi et al. | |
| 2019/0082536 A1 | 3/2019 | Park et al. | |
| 2019/0097339 A1 | 3/2019 | Lim et al. | |
| 2019/0104212 A1 | 4/2019 | Lee et al. | |
| 2019/0187760 A1 | 6/2019 | Han et al. | |
| 2020/0036824 A1 | 1/2020 | Lee et al. | |
| 2020/0293095 A1 | 9/2020 | Han et al. | |
| 2020/0296833 A1 | 9/2020 | Park et al. | |

FOREIGN PATENT DOCUMENTS

| | | | |
|---|---|---|---|
| KR | 10-2016-0103397 | 9/2016 | |
| KR | 10-2017-0084750 | * 10/2017 | ......... H04M 1/0264 |
| KR | 10-2019-0004481 A | 1/2019 | |
| KR | 10-2019-0029215 | 3/2019 | |
| KR | 10-2019-0038264 | 4/2019 | |

OTHER PUBLICATIONS

International Search Report and Written Opinion dated Oct. 28, 2020 in corresponding International Application No. PCT/KR2020/008915.
Korean Office Action dated Aug. 3, 2023 for KR Application No. 10-2019-0096029.

* cited by examiner

ELECTRONIC DEVICE INCLUDING SENSOR

CROSS-REFERENCE TO RELATED APPLICATION

This application is based on and claims priority under 35 U.S.C. § 119 to Korean Patent Application No. 10-2019-0096029, filed on Aug. 7, 2019, in the Korean Intellectual Property Office, the disclosure of which is incorporated by reference herein its entirety.

BACKGROUND

1. Field

The disclosure relates to an electronic device including a sensor.

2. Description of Related Art

A portable electronic device such as a smartphone may include various sensors. For example, the portable electronic device may include at least one of a proximity sensor, an illuminance sensor, a proximity illuminance sensor, or an image sensor. Furthermore, the portable electronic device may include a fingerprint sensor. At least one of the sensors is disposed inside the electronic device for the purpose of expanding the size of a display of the electronic device and forming an appealing external appearance.

The sensor disposed inside the electronic device may be affected by noise generated from another component of the electronic device. For example, the sensor disposed inside the electronic device may be disposed adjacent to a conductive support member (or, a metal housing, a metal frame, or a metal support member) that are included in the electronic device. In this case, noise generated by a specific component among components of the electronic device may be introduced into the sensor through the conductive support member (or, the metal support member). When the sensor collects signals including noise, the electronic device that processes the signals transferred by the sensor may abnormally operate.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and provide at least the advantages described below. Accordingly, embodiments of the disclosure provide an electronic device including a sensor, in which the electronic device interrupts a noise transfer path such that noise transferred to the sensor is prevented and/or reduced.

In accordance with an example embodiment of the disclosure, an electronic device includes: a display, an antenna structure including at least one antenna, a conductive support disposed between the display and the antenna structure, a sensor disposed between the display and the conductive support, a first printed circuit board disposed between the conductive support and the antenna structure, a second printed circuit board stacked on the first printed circuit board, a board support coupled with the conductive support and overlapping at least part of the second printed circuit board, and a first insulating member comprising an insulating material disposed between the board support and the antenna structure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
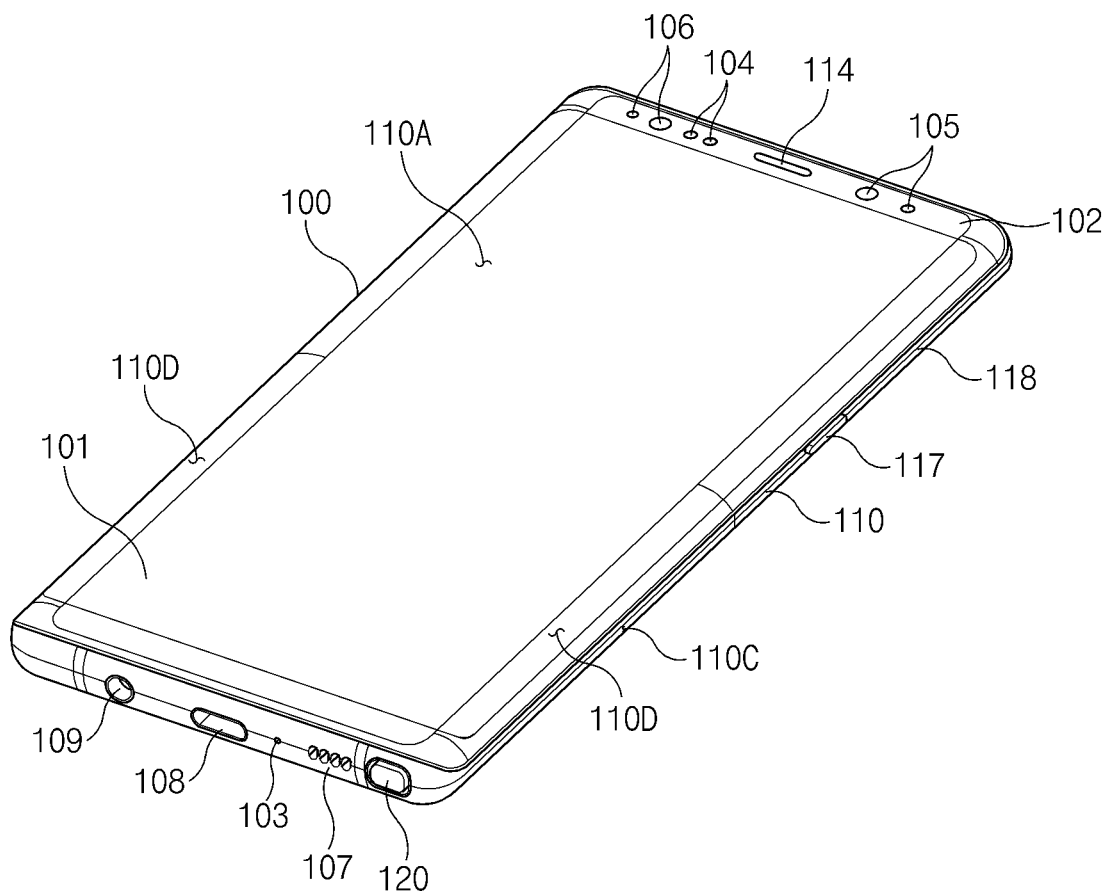
FIG. 1 is a front perspective view illustrating an example electronic device according to various embodiments.

Hereinafter, various example embodiments of the disclosure may be described with reference to accompanying drawings. Accordingly, those of ordinary skill in the art will recognize that various modifications, equivalents, and/or alternatives on the various example embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. When a component (e.g., a first component) is referred to as being "directly coupled with/to" or "directly connected to" another component (e.g., a second component), it should be understood that there are no intervening components (e.g., a third component).

According to the situation, the expression "configured to" used in the disclosure may be used as, for example, the expression "suitable for", "having the capacity to", "designed to", "adapted to", "made to", or "capable of". The term "configured to" does not refer only "specifically designed to" in hardware. Instead, the expression "a device configured to" may refer to the device being "capable of" operating together with another device or other parts. For example, a "processor configured to (or set to) perform A, B, and C" may refer, for example, to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe example embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), a bio-implantable type (e.g., an implantable circuit), or the like, but the disclosure is not limited thereto.

Hereinafter, electronic devices according to various example embodiments will be described in greater detail with reference to the accompanying drawings. In the disclosure, the term "user" may refer to a person who uses an electronic device or may refer to a device (e.g., an artificial intelligence electronic device) that uses the electronic device.

Figure 2:
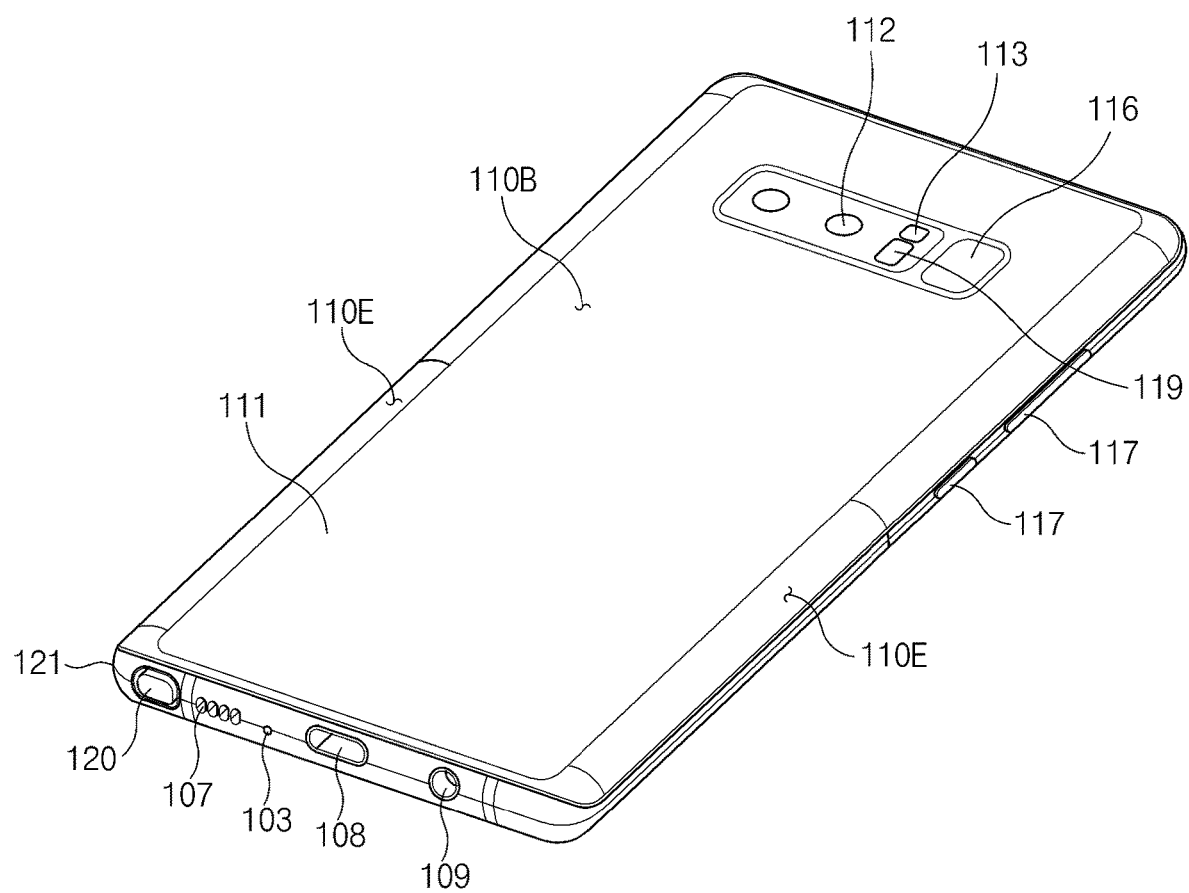
FIG. 2 is a rear perspective view illustrating an example electronic device according to various embodiments.

FIG. 1 is a front perspective view illustrating an example electronic device according to various embodiments, and FIG. 2 is a rear perspective view illustrating an example electronic device according to various embodiments.

Referring to FIGS. 1 and 2, the electronic device 100 according to an embodiment may include a housing 110 that includes a first surface (or, a front surface) 110A, a second surface (or, a rear surface) 110B, and side surfaces 110C that surround a space between the first surface 110A and the second surface 110B. In another embodiment (not illustrated), a housing may refer to a structure that forms the first surface 110A, the second surface 110B, and a part of the side surfaces 110C of FIG. 1. According to an embodiment, at least part of the first surface 110A may be formed by a front plate 102, at least part of which is substantially transparent (e.g., a glass plate including various coating layers, or a polymer plate). At least part of the second surface 110B may be formed by a back plate 111 that is substantially opaque. At least part of the back plate 111 may be formed of, for example, coated or colored glass, ceramic, polymer, metal (e.g., aluminum, stainless steel (STS), or magnesium), or a combination of at least two thereof. The side surfaces 110C may be formed by a metal support member (or, a "side member") 118 that is coupled with the front plate 102 and the back plate 111 and that contains metal and/or a polymer. In some embodiments, the back plate 111 and the metal support member 118 may be integrally formed with each other and may contain the same material (e.g., a metallic material such as aluminum).

In the illustrated embodiment, the front plate 102 may include, at opposite long edges thereof, two first areas 110D that curvedly and seamlessly extend from the first surface 110A toward the back plate 111. In the illustrated embodiment (refer to FIG. 2), the back plate 111 may include, at opposite long edges thereof, two second areas 110E that curvedly and seamlessly extend from the second surface 110B toward the front plate 102. In some embodiments, the front plate 102 (or, the back plate 111) may include only one of the first areas 110D (or, the second areas 110E). In another embodiment, a part of the first areas 110D or the second areas 110E may not be included. In the above embodiments, when viewed from a side of the electronic device 100, the metal support member 118 may have a first thickness (or, width) at sides not including the first areas 110D or the second areas 110E and may have a second thickness at sides including the first areas 110D or the second areas 110E, the second thickness being smaller than the first thickness.

According to an embodiment, the electronic device 100 may include at least one of a display 101, audio modules 103, 107, and 114, sensor modules 104, 116, and 119, camera modules 105, 112, and 113, key input devices 117, a light emitting element 106, a pen input device 120, or connector holes 108 and 109. In some embodiments, the electronic device 100 may omit at least one component (e.g., the key input devices 117 or the light emitting element 106) among the aforementioned components, or may additionally include other component(s).

The display 101 may be exposed through, for example, a large portion of the front plate 102. In some embodiments, at least part of the display 101 may be exposed through the front plate 102 that forms the first surface 110A and the first areas 110D of the side surfaces 110C. In some embodiments, corners of the display 101 may be formed to be substantially the same as the shapes of adjacent outside edges of the front plate 102. In another embodiment (not illustrated), to expand the area by which the display 101 is exposed, the gap between the periphery of the display 101 and the periphery of the front plate 102 may be formed to be substantially the same.

In another embodiment (not illustrated), a recess or an opening may be formed in a screen display area of the display 101, and the electronic device 100 may include at least one of the audio module 114, the sensor module 104, the camera module 105, or the light emitting element 106 that is aligned with the recess or the opening. In another embodiment (not illustrated), at least one of the audio module 114, the sensor module 104, the camera module 105, the fingerprint sensor 116, or the light emitting element 106 may be disposed on a rear surface of the screen display area of the display 101. In another embodiment (not illustrated), the display 101 may be coupled with, or disposed adjacent to, touch detection circuitry, a force sensor for measuring the intensity (force) of a touch, and/or a digitizer for detecting a stylus pen of a magnetic type. In some embodiments, at least a part of the sensor modules 104 and 119 and/or at least a part of the key input devices 117 may be disposed in the first areas 110D and/or the second areas 110E.

The audio modules 103, 107, and 114 may include the microphone hole 103 and the speaker holes 107 and 114. A microphone for obtaining a sound from the outside may be disposed in the microphone hole 103, and in some embodiments, a plurality of microphones may be disposed in the microphone hole 103 to detect the direction of a sound. The speaker holes 107 and 114 may include the external speaker hole 107 and the receiver hole 114 for a telephone call. In some embodiments, the speaker holes 107 and 114 and the microphone hole 103 may be implemented with a single hole, or a speaker (e.g., a piezoelectric speaker) may be included without the speaker holes 107 and 114.

The sensor modules 104, 116, and 119 may generate an electrical signal or a data value that corresponds to an operational state inside the electronic device 100 or an environmental state external to the electronic device 100. The sensor modules 104, 116, and 119 may include, for example, the first sensor module 104 (e.g., a proximity sensor) and/or the second sensor module (not illustrated) (e.g., a fingerprint sensor) that is disposed on the first surface 110A of the housing 110, and/or the third sensor module 119 (e.g., an HRM sensor) and/or the fourth sensor module 116 (e.g., a fingerprint sensor) that is disposed on the second surface 110B of the housing 110. The fingerprint sensor may be disposed not only on the first surface 110A of the housing 110 (e.g., the display 101) but also on the second surface 110B. The electronic device 100 may further include a non-illustrated sensor module, which may be, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112, and 113 may include the first camera device 105 disposed on the first surface 110A of the electronic device 100 and the second camera device 112 and/or the flash 113 disposed on the second surface 110B.

The camera devices 105 and 112 may include one or more lenses, an image sensor, and/or an image signal processor. The flash 113 may include, for example, a light emitting diode or a xenon lamp. In some embodiments, two or more lenses (an IR camera lens, a wide angle lens, and a telephoto lens) and image sensors may be disposed on one surface of the electronic device 100.

The key input devices 117 may be disposed on the side surfaces 110C of the housing 110. In another embodiment, the electronic device 100 may not include all or some of the aforementioned key input devices 117, and the key input devices 117 not included may be implemented in different forms such as soft keys on the display 101. In some embodiments, the key input devices 117 may include the sensor module 116 disposed on the second surface 110B of the housing 110.

The light emitting element 106 may be disposed on, for example, the first surface 110A of the housing 110. For example, the light emitting element 106 may provide state information of the electronic device 100 in the form of light. In another embodiment, the light emitting element 106 may provide, for example, a light source that operates in conjunction with operation of the camera module 105. The light emitting element 106 may include, for example, an LED, an IR LED, and a xenon lamp.

The connector holes 108 and 109 may include the first connector hole 108 for accommodating a connector (e.g., a USB connector) for transmitting and receiving power and/or data with an external electronic device, and/or the second connector hole 109 (e.g., an earphone jack) for accommodating a connector for transmitting and receiving audio signals with an external electronic device.

The pen input device 120 (e.g., a stylus pen) may be inserted into, or ejected from, the housing 110 through a hole 121 formed in a side surface of the housing 110 and may include a button for facilitating the ejection. The pen input device 120 may have a separate resonance circuit embedded therein and may operate in conjunction with an electromagnetic induction panel 390 (e.g., a digitizer) that is included in the electronic device 100. The pen input device 120 may include an electromagnetic resonance (EMR) type, an active electrical stylus (AES) type, and an electric coupled resonance (ECR) type.

Figure 3:
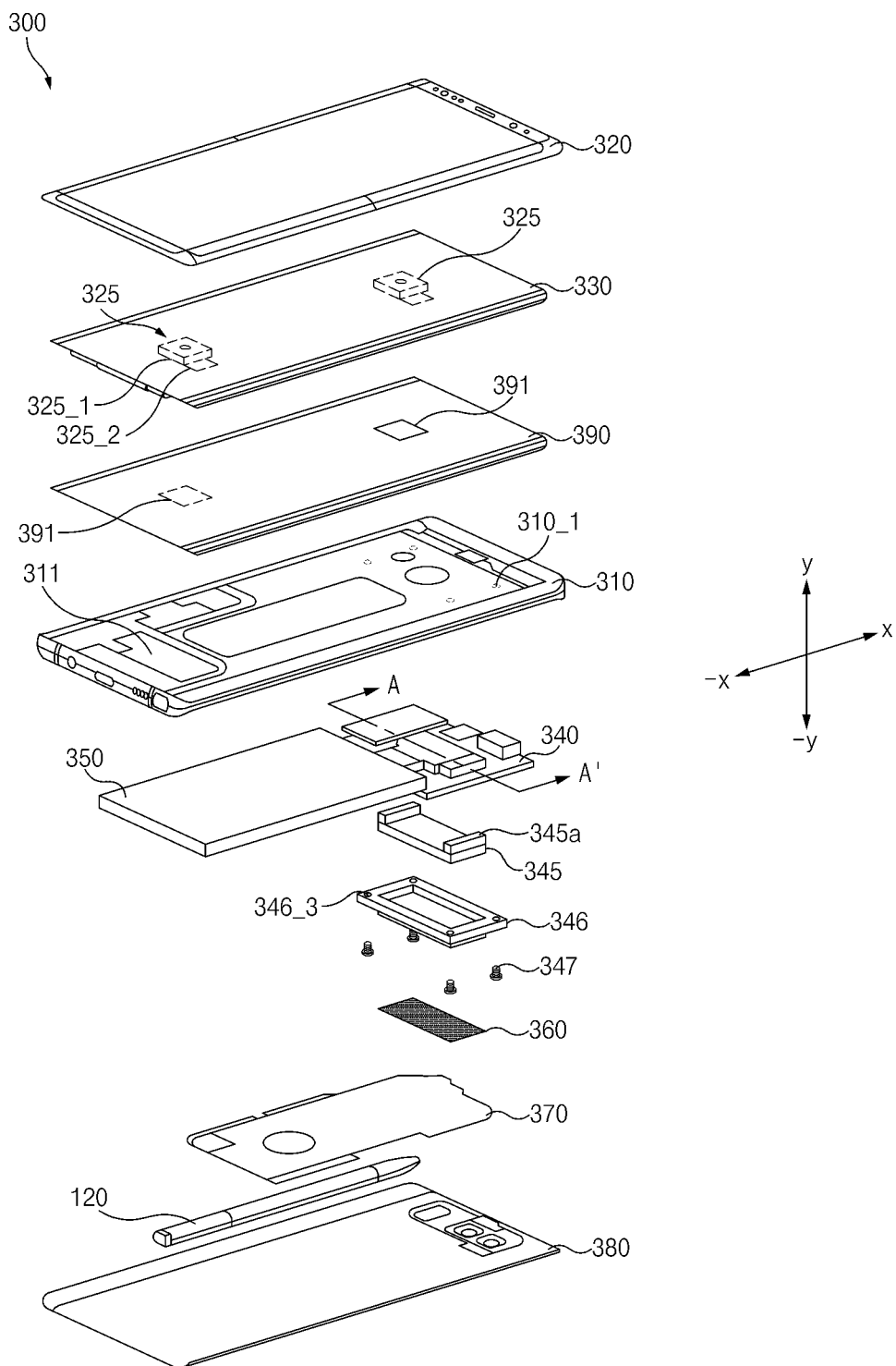
FIG. 3 is an exploded perspective view illustrating an example electronic device according to various embodiments.

FIG. 3 is an exploded perspective view illustrating an example electronic device according to various embodiments.

Referring to FIG. 3, the electronic device 300 may include a front plate 320, a display 330, an electromagnetic induction panel 390, a conductive support member (e.g., support) 310 (or, a metal housing, a metal frame, or a metal support member), a first support member (e.g., support) 311 (e.g., a bracket), a first printed circuit board 340, a second printed circuit board 345, a board support member (e.g., support) 346, a first insulating member (e.g., including an insulating material) 360, a battery 350, an antenna structure (e.g., including at least one antenna) 370, a pen input device 120, and a back plate 380 (or, an antenna pad). In some embodiments, the electronic device 300 may omit at least one of the aforementioned components (e.g., at least one of the first support member 311, the electromagnetic induction panel 390, or the pen input device 120), or may additionally include other component(s). At least one of the components of the electronic device 300 may be the same as, or similar to, at least one of the components of the electronic device 100 of FIG. 1 or 2, and repetitive descriptions may not be repeated here.

The display 330 may include a plurality of pixels related to displaying a screen. According to an embodiment, the plurality of pixels may be disposed in a matrix form. A printed circuit board may be disposed in connection with driving the display 330. The printed circuit board may be disposed on a rear surface of the display 330 (e.g., a surface opposite to the surface on which the screen is displayed or a surface facing in a second direction (−y-axis direction)). According to an embodiment, a display driver IC (DDI) may be disposed on the printed circuit board related to driving the display 330. At least one sensor 325 (e.g., a fingerprint sensor) may be disposed on at least one side of the rear surface of the display 330. In this case, the printed circuit board may have an opening having a size corresponding to the sensor 325 (e.g., a hole or a recess, or an opening having a smaller size than the sensor 325) to allow the sensor 325 to collect light (or, a signal) through the rear surface of the display 330. According to an embodiment, the sensor 325 may be disposed on at least part of the printed circuit board. The sensor 325 may obtain at least part of light external to the electronic device 300 through the opening and may obtain information corresponding to a fingerprint, based on the obtained light. According to an embodiment, the display 330 may include a panel layer in which at least one pixel used to display the screen is disposed and a rear panel (e.g., at least one of an embo layer, a heat dissipation layer, or a copper layer) that is disposed under the panel layer. At least part of the rear panel may be removed from the rear surface of the display 330, on which the sensor 325 is disposed, such that light or a signal can be transmitted.

According to an embodiment, the sensor 325 may be disposed on an upper side or a lower side of the display 330. The sensor 325 may include a sensing part 325_1 and a flexible printed circuit board 325_2. The sensing part 325_1 may collect light that is emitted from at least one pixel among the plurality of pixels disposed in the display 330 and that is reflected by a user's fingerprint brought into contact with a front surface of the display 330 (e.g., a surface facing in a first direction (+y-axis direction)). The sensing part 325_1 may include a light emitting portion that emits light (or, a signal) in the first direction (+y-axis direction) (or, the direction toward the front surface of the display 330) and a light receiving portion that collects the light (or, the signal) reflected after being emitted. According to an embodiment, the sensor 325 may obtain ultrasonic waves reflected by a part of the user's body (e.g., at least part of a finger) that is brought into contact with the front surface of the display 330 and may obtain information corresponding to the fingerprint of the user, based on the obtained ultrasonic waves. The flexible printed circuit board 325_2 may be electrically connected to the sensing part 325_1 and may transfer at least a part of signals collected by the sensing part 325_1 to a processor of the electronic device 300. At least part of the sensor 325 may be disposed adjacent to the conductive support member 310.

The electromagnetic induction panel 390 (e.g., a digitizer) may be a panel for detecting an input of the pen input device 120. For example, the electronic device 300 may include a digitizer capable of detecting an input by a digital pen brought into contact with, or adjacent to, at least part of the display 330, based on an electromagnetic induction method. According to an embodiment, a capacitive digitizer may be applied as a technology for recognizing the digital pen. The capacitive digitizer may allow current to flow over the display 330 and may detect and recognize a change generated by contact of a conductor (e.g., a digital pen). The digital pen may be classified into an electromagnetic resonance (EMR) type digital pen using an electromagnetic resonance method and an active electrostatic solution (AES) type digital pen using an active electrostatic method. For example, in the case of the EMR type digital pen, a separate panel called a digitizer may be disposed in the display 330, and the electronic device 300 may recognize the position of the digital pen by using a coil in the digital pen through which current flows and a wireless frequency. For example, when the digitizer generates a magnetic field and sends the magnetic field to the digital pen, the digital pen may detect the magnetic field and may transfer, through a circuit in the digital pen, energy transmitted to the digital pen as a wireless frequency signal to measure the strength of the signal. The AES type digital pen may include an electromagnetism generator therein without a separate digitizer. Because the digitizer is sensitive to electromagnetism and noise, a shield sheet is required to interrupt interference for internal or external noise or an electromagnetic field. For example, the electromagnetic induction panel 390 may include a printed circuit board (PCB) (e.g., a flexible printed circuit board (FPCB)) and a shield sheet. The shield sheet may prevent interference between the components by electromagnetic fields generated from the components (e.g., the display panel, the printed circuit board, and the electromagnetic induction panel) that are included in the electronic device 300. The shield sheet may block the electromagnetic fields generated from the components, thereby allowing an input from the pen input device 120 to be accurately transferred to a coil included in the electromagnetic induction panel 390.

With reference to FIG. 3, the structure in which the sensor 325 is disposed on the rear surface of the display 330 is illustrated. However, in a case where the sensor 325 is added to at least one surface of the electromagnetic induction panel 390, the sensor 325 may be disposed on the bottom of the electromagnetic induction panel 390. In this case, the electromagnetic induction panel 390 may include an opening 391 formed in at least a partial area corresponding to the sensor 325 mounted in the electronic device 300. In a case where a plurality of sensors 325 are disposed, a plurality of openings 391 may be formed. In a case where the sensor 325 is disposed only on a lower side of the rear surface of the display 330, the opening 391 may be located on a lower side to correspond to the position of the sensor 325.

At least part of the conductive support member 310 may include a support formed of a metallic material and may form side surfaces of the electronic device 300. The conductive support member 310 may be prepared by machining a metal plate. At least part of the conductive support member 310 may serve as an antenna related to a wireless communication function of the electronic device 300. The first support member 311 may include a support disposed inside the conductive support member 310. The first support member 311 may be part of the conductive support member 310, or may be integrated with the conductive support member 310 while being formed through separate injection molding.

The first support member 311 may be disposed in the electronic device 300 and may be connected with the conductive support member 310, or may be integrally formed with the conductive support member 310. The first support member 311 may be formed of, for example, a metallic material and/or a non-metallic material (e.g., a polymer, a magnesium material, or an alloy). The display 330 may be coupled to one surface of the first support member 311 (e.g., a surface facing in the first direction (+y-axis direction)), and the first printed circuit board 340 may be coupled to an opposite surface of the first support member 311 (e.g., a surface facing in the second direction (e.g., −y-axis direction)). The first support member 311 may be provided in a form integrated with the conductive support member 310, or may be formed together when the conductive support member 310 is formed. A first coupling area 310_1 to which a fixing member 347 for fixing the board support member 346 is coupled may be formed on one side of the first support member 311. The first coupling area 310_1 may include a recess (or, a hole) and a thread formed on an inner wall of the recess (or, the hole), in which the recess (or, the hole) is formed in a direction (e.g., the second direction (−y-axis direction)) toward the first printed circuit board 340 from a surface (or, an upper surface) of the conductive support member 310 that faces in the first direction (+y-axis direction). Depending on the form of the fixing member 347, the first coupling area 310_1 may be formed in a stopping structure to which a hook is coupled. In this case, at least part of the fixing member 347 may include a hook form capable of being coupled with the stopping structure. According to various embodiments, the first support member 311 or the conductive support member 310 may include, on at least one side thereof, a recess or a hole in which the sensor 325 is seated. An insulating member capable of interrupting electrical connection between the sensor 325 and the conductive support member 310 may be disposed around the recess or the hole. The following description will be given based on a form in which the first support member 311 is integrated with the conductive support member 310.

An electrical element may be mounted on the first printed circuit board 340. The electrical element may include, for example, and without limitation, a processor, a memory, and/or an interface. The processor may include, for example, and without limitation, one or more of a central processing unit, an application processor, a dedicated processor, a graphic processing unit, an image signal processor, a sensor hub processor, a communication processor, or the like. The memory may include, for example, a volatile memory or a non-volatile memory. The interface may include, for example, a high definition multimedia interface (HDMI), a universal serial bus (USB) interface, an SD card interface, and/or an audio interface. The interface, for example, may electrically or physically connect the electronic device 300 with an external electronic device and may include a USB connector, an SD card/MMC connector, or an audio connector. In the illustrated drawing, the first printed circuit board 340 is illustrated as being eccentrically located in a third direction (+x-axis direction). However, the disclosure is not limited thereto. For example, the first printed circuit board 340 may be eccentrically located in a fourth direction (−x-axis direction).

The second printed circuit board 345 may be stacked on the first printed circuit board 340. For example, the second printed circuit board 345 may be stacked on the first printed circuit board 340 in the first direction (+y-axis direction). For example, the second printed circuit board 345 may have a smaller size than the first printed circuit board 340. The second printed circuit board 345 may be disposed substantially side by side with the first printed circuit board 340 (e.g., may be disposed side by side with the first printed circuit board 340 in a state of being spaced apart from the first printed circuit board 340 at a predetermined interval in the vertical direction) and may be electrically connected with the first printed circuit board 340 by an interposer 345a.

The interposer 345a may be disposed between the first printed circuit board 340 and the second printed circuit board 345 and may electrically connect at least part of at least one electrical element disposed on the first printed circuit board 340 and at least part of an electrical element disposed on the second printed circuit board 345. At least one electrical element (e.g., a memory, a processor, or an interface) may be disposed on the second printed circuit board 345. According to an embodiment, an RFIC or a communication processor (CP) for operating a wireless communication module (e.g., a 4G communication module or a 5G communication module) may be disposed on the second printed circuit board 345. Alternatively, a processor related to control of the at least one sensor 325 may be disposed on the second printed circuit board 345. At least one component (e.g., at least one of a power management IC (PMIC), a charging receiver IC (RxIC), or a charging transmitter IC (TxIC)) that is related to battery charging may be disposed on the second printed circuit board 345. At least part of the second printed circuit board 345 may be protected by the board support member 346. In a case where the first printed circuit board 340 is eccentrically located in the fourth direction (−x-axis direction), the second printed circuit board 345 may also be eccentrically located in the fourth direction so as to be disposed side by side with the first printed circuit board 340 in the vertical direction.

The board support member 346 may cover at least part of the second printed circuit board 345, which is stacked on the first printed circuit board 340, in the first direction (+y-axis direction). In this regard, at least part of the board support member 346 may be formed of a metallic material (e.g., SUS (stainless steel)), and the board support member 346 may be provided in a shape (e.g., a hat shape) that has an empty space formed therein in which the second printed circuit board 345 is seated. The periphery of the board support member 346 may be disposed to be brought into contact with at least part of the first printed circuit board 340. At least one fixing member 347 may be disposed to fix the board support member 346 to the first printed circuit board 340. In this regard, the board support member 346 may include a coupling hole 346_3 to which at least part of the fixing member 347 is coupled. The fixing member 347 may be coupled with the first coupling area 310_1, which is provided on one side of the conductive support member 310 (or, the first support member 311), after passing through the coupling hole 346_3 formed in the board support member 346 and passing through the first printed circuit board 340.

The battery 350 may be a device for supplying power to at least one component of the electronic device 300. For example, at least part of the battery 350 may be disposed on substantially the same plane as the first printed circuit board 340 (or, the first printed circuit board 340 and the second printed circuit board 345), or may be disposed on at least one side surface of the first printed circuit board 340. The battery 350 may be integrally disposed inside the electronic device 300, or may be disposed so as to be detachable from the electronic device 300.

At least one antenna structure 370 may be disposed between the back plate 380 and the battery 350. According to an embodiment, the antenna structure 370 may include at least one of at least one antenna, an antenna pattern, an opening, a joint portion, an antenna pad, or an antenna connecting portion. For example, the antenna of the antenna structure 170 may include at least one of a near field communication (NFC) antenna, a wireless charging antenna, and/or a magnetic secure transmission (MST) antenna. The antenna structure 370, for example, may perform short range communication with an external device, or may wirelessly transmit and receive power required for charging. In another embodiment, an antenna structure may be formed by the conductive support member 310 and/or part of the first support member 311, or a combination thereof.

According to an embodiment, the first insulating member (e.g., including an insulating material) 360 may be disposed between the antenna structure 370 and the board support member 346. According to an embodiment, the first insulating member 360 may include at least one insulating layer formed by at least one of an insulating tape, an insulating mesh, or an insulating material. According to an embodiment, the first insulating member 360 may have a specified thickness to form a predetermined interval between the antenna structure 370 and the board support member 346. The first insulating member 360 may serve to block noise such that noise generated through the antenna structure 370 is not transferred to the board support member 346. In this regard, the first insulating member 360 may have a size for blocking the noise generated from the antenna structure 370. For example, the first insulating member 360 may be formed in a size corresponding to the size of at least part of the antenna structure 370, or may be formed to be equal to or larger than the area where the back plate 380 (or, the antenna pad) on which the at least one antenna structure 370 is disposed and the board support member 346 overlap each other when viewed from above the electronic device 300 (e.g., when viewed in the second direction (−y-axis direction)). The first insulating member 360 may have a size corresponding to the board support member 346 (or, a size corresponding to a cover portion of the board support member 346 that protrudes upward). In another case, the first insulating member 360 may have a size corresponding to the size of the area where the antenna structure 370 and the board support member 346 overlap each other when the antenna structure 370 and the board support member 346 are disposed in the vertical direction. According to various embodiments, the first insulating member 360 may be formed in a size to cover the entire antenna structure 370.

According to an embodiment, the first insulating member 360 may have a specified thickness (e.g., 15 μm (micrometers)) or more to block noise by a signal (e.g., a wireless power signal) supplied through the antenna structure 370 (e.g., to interrupt induction of an AC power signal or a noise signal of hundreds of KHz). According to an embodiment, in a case of blocking noise by power related to wireless charging, a significant noise removal effect may be experimentally obtained when an insulating member has a thickness of 20 μm or more, and a clear noise removal effect may be experimentally obtained when an insulating member has a thickness of 60 μm or more. According to an embodiment, the first insulating member 360 may have a thickness of 20 μm or more, or 60 μm or more. The thickness of the first insulating member 360 may vary depending on a frequency used in wireless charging or the magnitude of power supplied by wireless charging. According to an embodiment, a noise path along which noise affecting the flexible printed circuit board 325_2 of the sensor 325 is generated may be formed through a wireless charger, the antenna structure 370, the board support member 346, the fixing member 347, and the conductive support member 310, and the first insulating member 360 may be disposed between the antenna structure 370 and the board support member 346 on the noise path to interrupt the path along which noise is transferred.

Although it has been illustrated by way of non-limiting example that the electronic device 300 includes the electromagnetic induction panel 390 and the pen input device 120, the disclosure is not limited thereto. For example, the electronic device 300 may not include the electromagnetic induction panel 390 and the pen input device 120.

Figure 4:
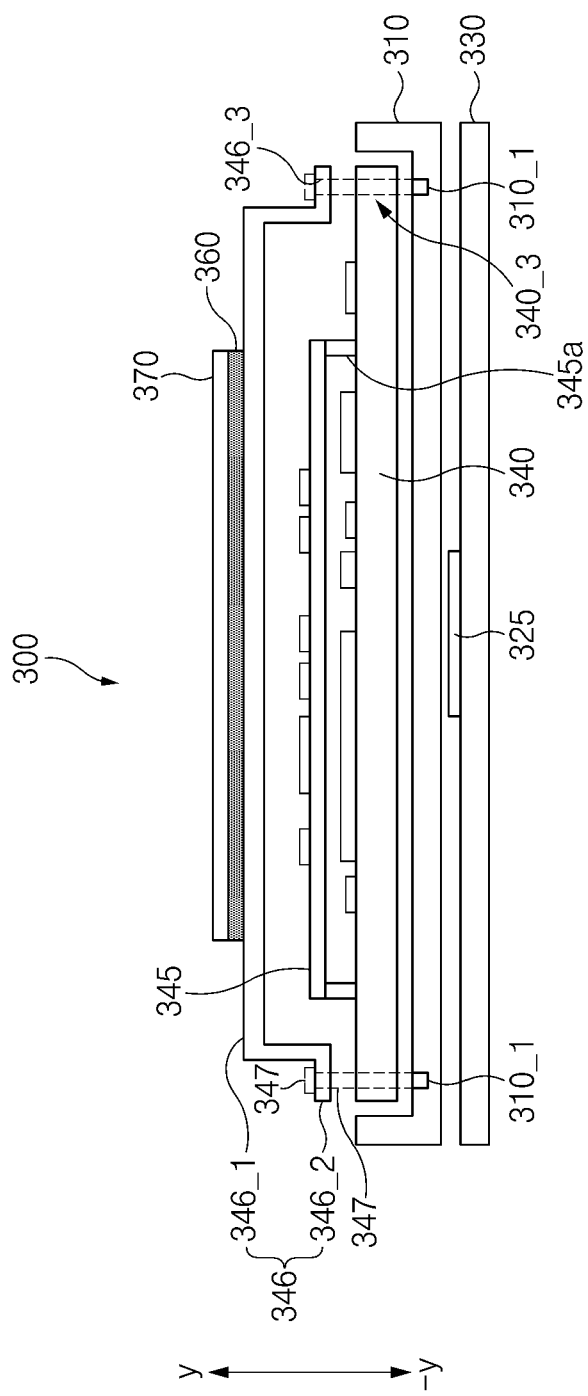
FIG. 4 is a sectional view illustrating an example of a section of some components of the electronic device, where the section is taken along line A-A' in FIG. 3 according to various embodiments.

FIG. 4 is a sectional view illustrating an example of a section of some components of the electronic device, where the section is taken along line A-A' in FIG. 3 according to various embodiments.

Referring to FIG. 4, the electronic device 300 may include the display 330, the conductive support member 310, the first printed circuit board 340, the second printed circuit board 345, at least one interposer 345a, the board support member 346, the first insulating member 360, and the antenna structure 370. Additionally, the electronic device 300 may further include at least one of the back plate 380, the front plate 320, the electromagnetic induction panel 390, or the pen input device 120 described above with reference to FIG. 3.

Referring to FIG. 4, the sensor 325 may be disposed on one side of the upper surface of the display 330 (or, the rear surface or the surface facing in the second direction (−y-axis direction)) that is opposite to the front surface (e.g., the surface facing in the first direction (+y-axis direction)) on which the screen is displayed. According to an embodiment, the sensor 325 may be formed in a size corresponding to the front surface of the display 330. For example, the sensor 325 may be formed to recognize the user's fingerprint brought into contact with the front surface of the display 330. For convenience of description, the sensor 325 is illustrated as being disposed on a central portion of the display 330. However, the disclosure is not limited thereto. For example, the sensor 325 may be eccentrically disposed on a left or right side of the display 330 based on the illustrated drawing. Noise may be transferred to the sensor 325 through the conductive support member 310. Therefore, in a case where the first insulating member 360 is not present, noise induced to the antenna structure 370 may affect the sensor 325 through the conductive support member 310 irrespective of the position of the sensor 325 on the rear surface of the display 330.

The conductive support member 310 may be disposed over the sensor 325, and the first printed circuit board 340, the second printed circuit board 345, and the board support member 346 disposed to surround the second printed circuit board 345 may be stacked above at least part of the conductive support member 310. The first insulating member 360 and the antenna structure 370 may be disposed on the top of the board support member 346. The antenna structure 370 may include at least one antenna. The at least one antenna may be disposed as a pattern on at least part of the back plate 380, and an insulating layer may be disposed on the top of the antenna pattern. Alternatively, the at least one antenna may be formed as a pattern on a separate antenna pad, and the antenna pad having the antenna pattern formed thereon may be disposed between the first insulating member 360 and the back plate 380.

The above-described arrangement structure has been described based on the assumption that the front surface of the display 330 on which the screen is displayed faces downward (faces in the first direction (+y-axis direction)). However, the arrangement structure may be differently expressed depending on a reference point. For example, in a case where the front surface of the display 330 faces in the second direction (−y-axis direction), the first insulating member 360 may be disposed under the antenna structure 370, the board support member 346, the second printed circuit board 345, the first printed circuit board 340, the conductive support member 310, and the display 330 may be sequentially disposed below the first insulating member 360, and the sensor 325 may be disposed between the conductive support member 310 and the display 330. Furthermore, the above-described arrangement structure (or, stack structure) has been described based on cutting line A-A' in FIG. 3. However, an arrangement form may vary depending on the position of the cutting line.

The board support member 346 may include, for example, a cover portion 346_1 (e.g., an inverted "U" shape) that covers the second printed circuit board 345 and a flange portion 346_2 (e.g., a polygonal strap shape) that is formed at the periphery of the cover portion 346_1 and that has a predetermined width. For protection of the second printed circuit board 345, at least part of the board support member 346 may be formed of a metallic material (e.g., SUS). The board support member 346 may serve to block noise generated from the second printed circuit board 345. At least one coupling hole 346_3 may be formed in the flange portion 346_2. For example, in a case where the flange portion 346_2 has a rectangular strap shape, at least one coupling hole 346_3 may be formed in each corner area of the rectangular strap. Accordingly, the flange portion 346_2 may have a plurality of coupling holes 346_3 formed therein. At least part of the fixing member 347 may be located in the coupling hole 346_3.

The second printed circuit board 345 may have at least one electronic component disposed thereon and may include a lead (or, a sidewall or an interposer) for connection with the first printed circuit board 340. The distance between the second printed circuit board 345 and the first printed circuit board 340 may be smaller than the height of the cover portion 346_1 of the board support member 346. Alternatively, an insulating layer may be formed between the inside of the cover portion 346_1 of the board support member 346 and the second printed circuit board 345, or a heat transfer member (e.g., a thermal interface material (TIM)) (or, a heat dissipation member) for radiating heat generated from the second printed circuit board 345 to the outside or transferring the heat to the board support member 346 may be disposed between the inside of the cover portion 346_1 of the board support member 346 and the second printed circuit board 345.

At least one through-hole 340_3 may be formed on one side of the first printed circuit board 340. For example, the at least one through-hole 340_3 may be formed at at least one point in an area of the first printed circuit board 340 that faces the flange portion 346_2 of the board support member 346. According to an embodiment, the at least one through-hole 340_3 formed in the first printed circuit board 340 may be formed at a position corresponding to the position of the coupling hole 346_3 formed in the board support member 346.

The conductive support member 310 may include, in a position facing the through-hole 340_3 formed in the first printed circuit board 340, the first coupling area 310_1 to which the fixing member 347 is fixed. On one side of the conductive support member 310, the first coupling area 310_1 may be provided in the form of a recess or a hole (e.g., a hole formed through front and rear surfaces of the conductive support member 310), and a thread may be formed on at least part of an inner wall forming the hole.

As the above-described first insulating member 360 of the electronic device 300 is disposed between the antenna structure 370 and the board support member 346, the first insulating member 360 may serve to block noise during wireless charging such that noise generated through the antenna structure 370 is not transferred to the board support member 346. Accordingly, even though the sensor 325 is disposed adjacent to the conductive support member 310 or has a structure in which at least part of the sensor 325 is brought into contact with the conductive support member 310, no noise may be transferred to the sensor 325. Thus, a signal collection operation of the sensor 325 may be normally performed, or a signal collected by the sensor 325 may include a normal signal having no noise.

Referring to FIG. 4, the conductive support member 310 is illustrated as surrounding the first printed circuit board 340. However, the disclosure is not limited thereto. For example, part of the conductive support member 310 or at least a partial structure of the first support member 311 may be formed in a structure to surround the first printed circuit board 340.

Figure 5:
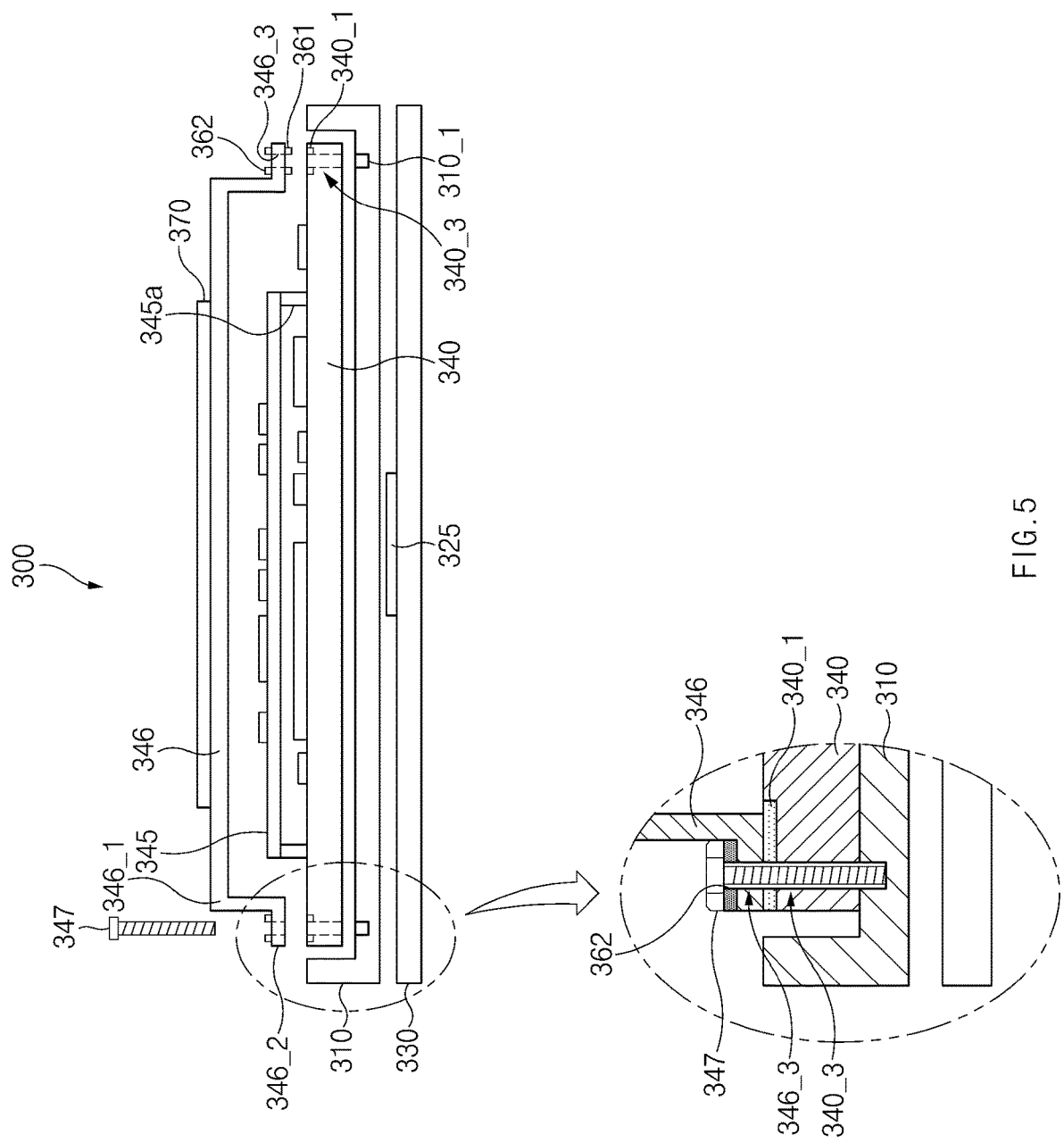
FIG. 5 is a sectional view illustrating an example of a section of the electronic device having a noise blocking path according to various embodiments.

FIG. 5 is a sectional view illustrating an example section of the electronic device having a noise blocking path according to various embodiments.

Referring to FIG. 5, the electronic device 300 may include the display 330, the conductive support member 310, the first printed circuit board 340, a second insulating member 361, the second printed circuit board 345, the at least one interposer 345a, the board support member 346, a third insulating member 362, and the antenna structure 370. The electronic device 300 may further include at least one of the back plate 380 disposed on the antenna structure 370 or the front plate 320 disposed on the front surface of the display 330. Furthermore, depending on a structure, the electronic device 300 may include only one of the second insulating member 361 or the third insulating member 362.

The electronic device 300 may not include a separate insulating member between the antenna structure 370 and the board support member 346, which is formed of a metallic material or a material capable of transferring electrical noise, and therefore noise generated by the antenna structure 370 may be transferred to the board support member 346. In this regard, the electronic device 300 may include the second insulating member 361 such that the board support member 346 is in a state (e.g., a floating state) of being spaced apart from the conductive support member 310 at a predetermined interval. For example, the second insulating member 361 may be disposed between the flange portion 346_2 of the board support member 346 and the first printed circuit board 340. According to an embodiment, the second insulating member 361 may be disposed between the flange portion 346_2 and the first printed circuit board 340. Alternatively, the second insulating member 361 may be disposed between the area around the coupling hole 346_3 and the area around the through-hole 340_3. The second insulating member 361 may serve to interrupt electrical connection between the board support member 346 formed of a metallic material and the first printed circuit board 340.

At least one third insulating member 362 may be disposed on the flange portion 346_2 of the board support member 346. For example, at least part of the third insulating member 362 may be disposed on one surface of the area around the coupling hole 346_3 formed in the flange portion 346_2 (e.g., an upper surface of the flange portion 346_2). The third insulating member 362 may be disposed between the flange portion 346_2 and the head of the fixing member 347 and may interrupt electrical connection between the board support member 346 and the fixing member 347.

According to various embodiments, a copper-foil-removed area 340_1 from which copper foil is removed may be formed on the area around the through-hole 340_3 of the first printed circuit board 340 and therefore the first printed circuit board 340 may be electrically separated (or, isolated) from the fixing member 347. Furthermore, although the flange portion 346_2 of the board support member 346 and one surface of the first printed circuit board 340 are physically connected in the copper-foil-removed area 340_1, the flange portion 346_2 of the board support member 346 and the one surface of the first printed circuit board 340 may be electrically isolated from each other by the removal of the copper foil.

According to various embodiments, the fixing member 347 may be formed of a metallic material. The fixing member 347 may be electrically separated from the board support member 346 through the third insulating member 362. The fixing member 347 may pass through the coupling hole 346_3 of the board support member 346 and the through-hole 340_3 of the first printed circuit board 340 and may be coupled to the first coupling area 310_1 formed on the conductive support member 310. Accordingly, even though the fixing member 347 is formed of a metallic material, the board support member 346 and the conductive support member 310 may be electrically separated from each other, and noise transferred to the board support member 346 through the antenna structure 370 may be blocked without being transferred to the conductive support member 310. To interrupt electrical connection between the fixing member 347 and the board support member 346, the width (or, the thickness or the diameter of a pillar) of the fixing member 347 may be smaller than the width (or, the diameter) of the coupling hole 346_3 of the board support member 346. The through-hole 340_3 formed in the first printed circuit board 340 may have a greater width (or, diameter) than the fixing member 347, or the copper-foil-removed area 340_1 from which the copper foil is removed may be formed around the through-hole 340_3. Accordingly, the first printed circuit board 340 may be electrically separated from the fixing member 347 by the removal of the copper foil even though making physical contact with the fixing member 347. For example, the copper-foil-removed area 340_1 may include a removal area to prevent transfer of noise despite contact, by removing conductivity by copper foil.

As described above, the electronic device 300 according to the embodiment may interrupt electrical connection between the fixing member 347, which fixes the board support member 346 to the conductive support member 310, and the board support member 346, thereby interrupting a noise introduction path. According to various embodiments, the fixing member 347 may be formed of a non-conductive material (e.g., plastic, reinforced plastic, or magnesium alloy). In this case, at least one of the second insulating member 361 or the third insulating member 362 may be removed. According to various embodiments, in a case where the flange portion 346_2 of the board support member 346 is formed of a non-conductive material, the separate copper-foil-removed area 340_1 may not be formed on the upper surface of the first printed circuit board 340 (e.g., the surface of the first printed circuit board 340 that faces the flange portion 346_2).

According to various embodiments, for floating of the board support member 346, the second insulating member 361, the third insulating member 362, and the copper-foil-removed area 340_1 may all be identically applied to a plurality of fixing members 347. The second insulating member 361, the third insulating member 362, and the copper-foil-removed area 340_1 may be differently applied depending on the positions of the fixing members 347. For example, in a process in which four fixing members fix one side of the board support member 346 to the conductive support member 310 with the first printed circuit board 340 therebetween, the third insulating member 362 and the copper-foil removed area 340_1 may be applied to fixing members on one side, and the second insulating member 361, the third insulating member 362, and the copper-foil-removed area 340_1 may all be applied to fixing members on an opposite side.

Figure 6:
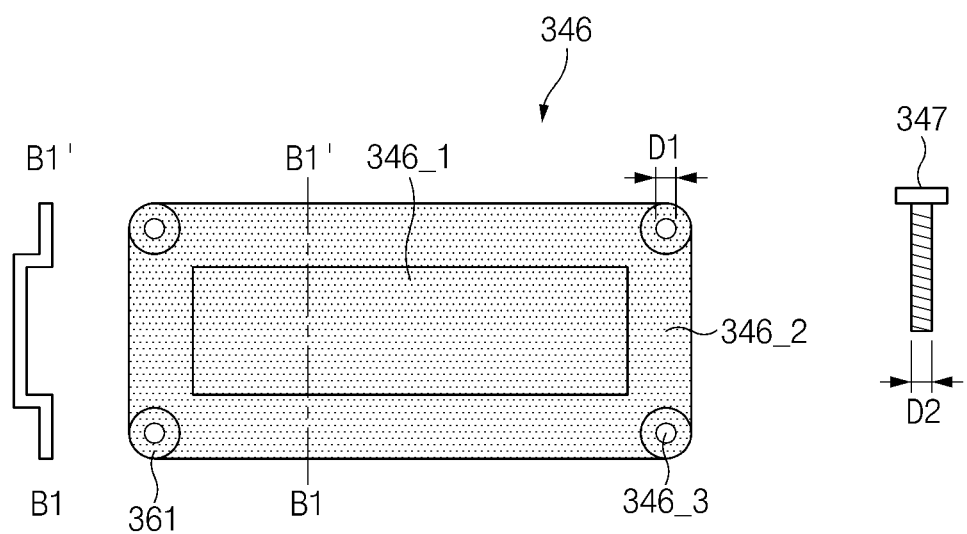
FIG. 6 is a diagram illustrating an example rear surface of a board support member located on a noise transfer path according to various embodiments.
Figure 7:
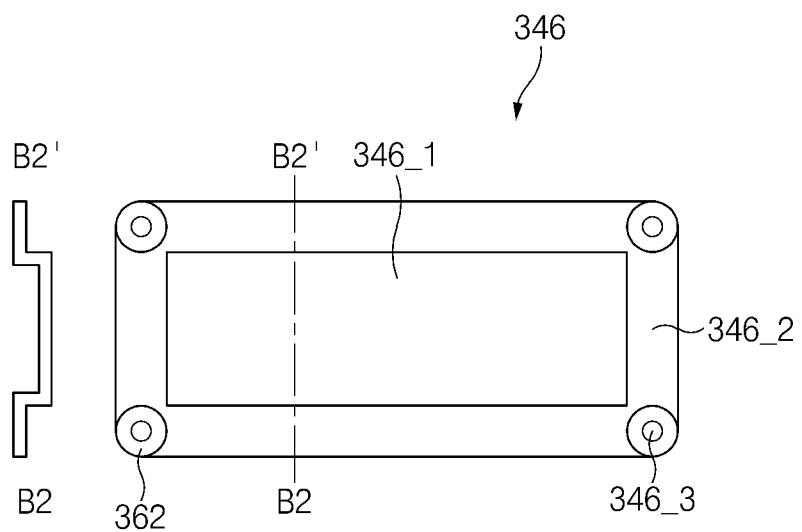
FIG. 7 is a diagram illustrating an example front surface of the board support member located on the noise transfer path according to various embodiments.

FIG. 6 is a diagram illustrating an example rear surface of the board support member located on a noise transfer path according to various embodiments, and FIG. 7 is a diagram illustrating an example front surface of the board support member located on the noise transfer path according to various embodiments. In the drawings, B1-B1' represents a section obtained by cutting one side of the board support member of FIG. 6, and B2-B2' represents a section obtained by cutting one side of the board support member of FIG. 7.

Referring to FIGS. 6 and 7, as described above, the board support member 346 may include the cover portion 346_1 and the flange portion 346_2. The cover portion 346_1 may have a lid shape that is empty inside, and at least part of the second printed circuit board 345 may be disposed inside the cover portion 346_1. According to an embodiment, the cover portion 346_1 may include an upper surface and sidewalls vertically extending from the periphery of the upper surface. The height of the sidewalls may be greater than the height of the second printed circuit board 345. According to an embodiment, the height of the sidewalls may be greater than the overall height of the second printed circuit board 345, at least one electrical element disposed on the second printed circuit board 345, and electrical elements disposed on the first printed circuit board 340.

A plurality of coupling holes 346_3 may be formed in the flange portion 346_2. For example, the coupling holes 346_3 may be formed in respective corners of the flange portion 346_2. The second insulating member 361 may be disposed on one surface of the area around each of the coupling holes 346_3 (e.g., a lower surface facing the first printed circuit board 340). The second insulating member 361 may have a size larger than the diameter D2 of the pillar of the fixing member 347 inserted. For electrical separation between the fixing member 347 and the flange portion 346_2, the first diameter D1 of the coupling hole 346_3 may be greater than the second diameter D2 of the fixing member 347. An insulating material may be applied to an inner surface of the coupling hole 346_3. In another case, the area around the coupling hole 346_3 may be formed of a material (e.g., a non-conductive material) that is different from the material of the other area of the flange portion 346_2.

The third insulating member 362 may be disposed on an opposite surface of the area around the coupling hole 346_3 of the flange portion 346_2 (e.g., an upper surface opposite to the first printed circuit board 340). The third insulating member 362 may have a larger size than the head of the fixing member 347. According to various embodiments, the third insulating member 362 may have the same size as the second insulating member 361. The third insulating member 362 may interrupt electrical connection between the board support member 346 and the fixing member 347.

Figure 8:
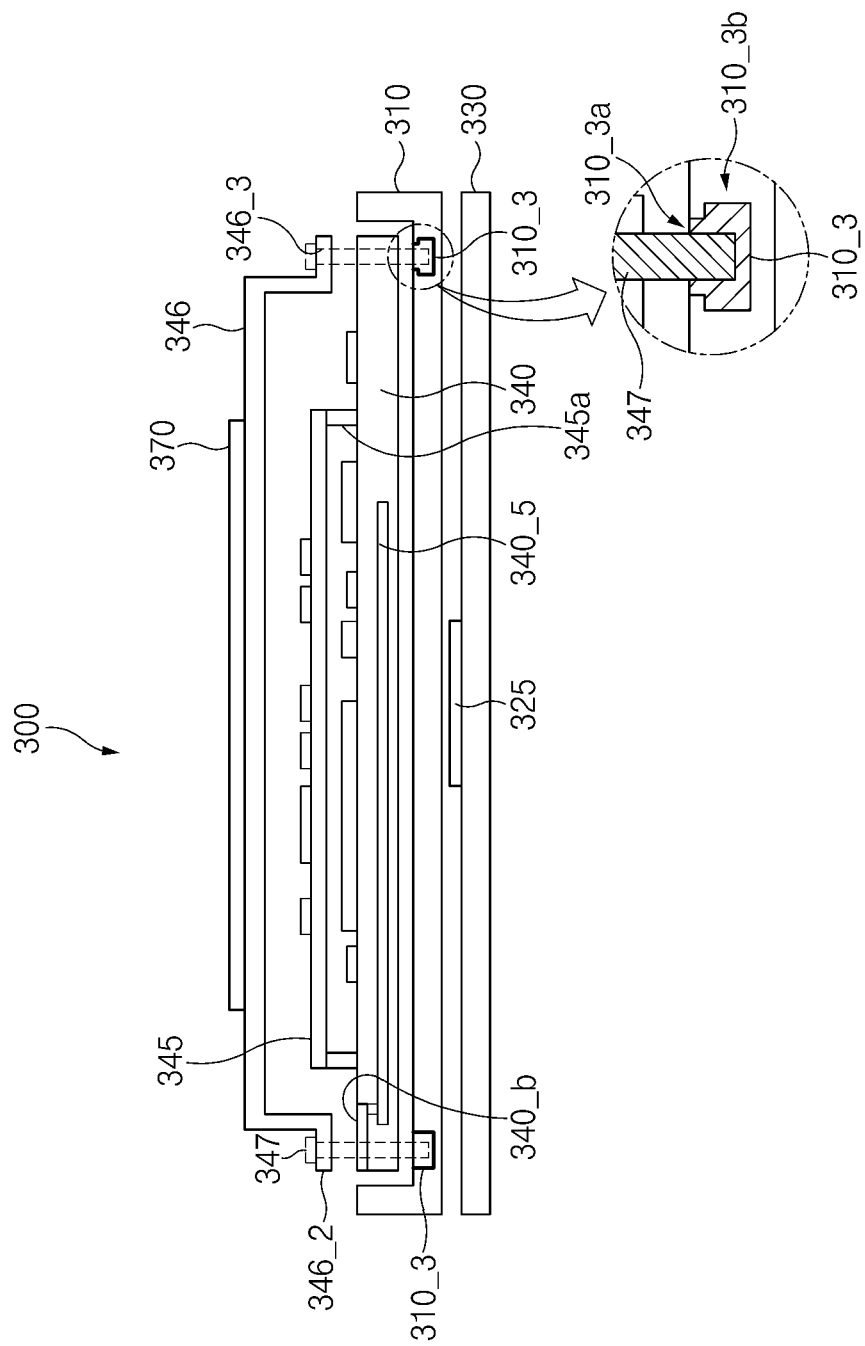
FIG. 8 is a sectional view illustrating an example section of the electronic device having a noise blocking path according to various embodiments.

FIG. 8 is a sectional view illustrating an example section of the electronic device having a noise blocking path according to various embodiments.

Referring to FIG. 8, the entirety or at least part of the electronic device 300 may include the display 330, the conductive support member 310, the first printed circuit board 340, the second printed circuit board 345, the at least one interposer 345a, the board support member 346 including the cover portion 346_1 and the flange portion 346_2, and the antenna structure 370. At least one sensor 325 may be disposed between the display 330 and the conductive support member 310, and a second coupling area 310_3 formed on one side of the conductive support member 310 may be formed of a non-conductive material.

According to an embodiment, the conductive support member 310 may include the second coupling area 310_3 coupled with the fixing member 347 that is formed of a metallic material and is used to couple the board support member 346. In a case where a plurality of fixing members 347 are provided, a plurality of second coupling areas 310_3 may be provided to correspond to the fixing members 347, respectively. The conductive support member 310 may include a recess or a hole such that the second coupling area 310_3 is formed. The second coupling area 310_3 may be formed of a non-conductive material. According to an embodiment, an opening 310_3a of the conductive support member 310 may have a smaller diameter than the interior 310_3b, and the interior 310_3b may have a larger diameter than the opening 310_3a. Correspondingly, the conductive support member 310 may include a recess in a jar or pot shape (or, a hole that is open toward the display 330). The second coupling area 310_3 may be formed in the recess or the hole with a non-conductive material (e.g., plastic or a non-conductive injection-molded structure) and may have a recess shape that is coupled with the fixing member 347. According to various embodiments, the conductive support member 310 may include a recess, the second coupling area 310_3 may have, inside the conductive support member 310, a recess formed with an injection-molded structure, the recess may have a shape that is coupled with the fixing member 347 (e.g., a recess having an internal thread or a recess formed for hook coupling).

Even when the fixing member 347 is electrically connected to the coupling hole 346_3 of the flange portion 346_2 of the board support member 346, noise induced through the antenna structure 370 may be blocked without being transferred to the conductive support member 310 because the conductive support member 310 and one side of the fixing member 347 are electrically separated from each other.

According to various embodiments, a ground area 340_5 of the first printed circuit board 340 may be electrically connected with the fixing member 347 through a ground terminal 340_b. At least part of noise transferred through the board support member 346 may be removed through the ground area 340_5 of the first printed circuit board 340. In the illustrated drawing, the ground area 340_5 is illustrated as being disposed in a lower area of the first printed circuit board 340. However, a bottom surface of the first printed circuit board 340 may be formed of an insulating layer and may be electrically separated from the conductive support member 310.

Figure 9:
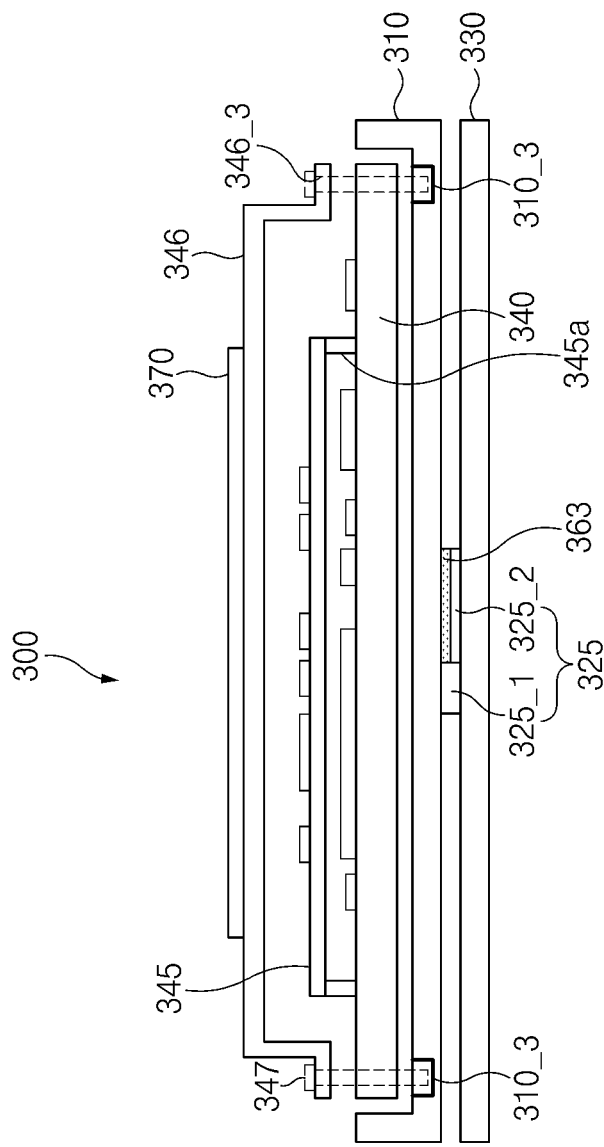
FIG. 9 is a sectional view illustrating an example section of the electronic device having a noise blocking path according to various embodiments.

FIG. 9 is a sectional view illustrating an example section of the electronic device having a noise blocking path according to various embodiments.

Referring to FIG. 9, the entirety or at least part of the electronic device 300 may include the display 330, the conductive support member 310, the first printed circuit board 340, the second printed circuit board 345, the at least one interposer 345a, the board support member 346, and the antenna structure 370. At least one sensor 325 may be disposed between the display 330 and the conductive support member 310, and a fourth insulating member 363 may be disposed between the conductive support member 310 and the sensor 325.

For example, the fourth insulating member 363 may be disposed on the flexible printed circuit board 325_2 (or, a wiring part) of the sensor 325 (e.g., the fourth insulating member 363 may be formed of an insulating tape (or, a conductive tape) and may be disposed to cover a wiring area included in the flexible printed circuit board 325_2) and may block noise induced to the flexible printed circuit board 325_2 of the sensor 325 through the conductive support member 310. According to various embodiments, the fourth insulating member 363 may be formed to surround the flexible printed circuit board 325_2 (e.g., may be formed in a tube shape or in a shielding part shape that surrounds an upper portion and a lower portion of the flexible printed circuit board 325_2 or surrounds the upper and lower portions and the entire lateral portion of the flexible printed circuit board 325_2). According to various embodiments, the second coupling area 310_3 formed on the conductive support member 310 of the electronic device 300 may be formed of a non-conductive material. The electronic device 300 may more firmly interrupt a path along which noise is introduced through the second coupling area 310_3 together with the fourth insulating member 363.

The embodiments in which the insulating members are disposed in the various positions such that an electrical signal induced through the antenna structure 370 is not transferred to the sensor 325 have been described above with reference to FIGS. 3, 4, 5, 6, 7, 8 and 9. However, the disclosure is not limited thereto. According to various embodiments, at least part of the embodiment illustrated in each drawing may be applied to the electronic device in combination with at least part of the embodiment illustrated in another drawing. For example, the arrangement structures of the insulating members 360, 361, 362, and 363, the form of the second coupling area 310_3, and operation of the ground area 340_5 may be applied in combination.

According to an embodiment, the electronic device 300 may include at least one of the first insulating member 360 disposed between the board support member 346 and the antenna structure 370, the second insulating member 361 disposed between the board support member 346 and the first printed circuit board 340, the third insulating member 362 disposed between the board support member 346 and the head of the fixing member 347, or the fourth insulating member 363 disposed between the sensor 325 and the conductive support member 310. Furthermore, the electronic device 300 may have the conductive support member 310 including only the second coupling area 310_3 that is formed of a non-conductive material independently of the first to fourth insulating members 363. The electronic device 300 may have a structure including at least one of the first to fourth insulating members 360 to 363 and the second coupling area 310_3. The structure that electrically connects the ground area 340_5 with the fixing member 347 may be applied to the electronic device 300 together with at least one of the first to fourth insulating members 360 to 363 and the second coupling area 310_3 formed of a non-conductive material, or may be independently applied to the electronic device 300. According to various embodiments, the configuration in which the fixing member 347 is formed of a non-conductive material may also be applied to the electronic device 300 together with at least one of the first to fourth insulating members 360 to 363 and the second coupling area 310_3 formed of a non-conductive material, or may be independently applied to the electronic device 300. The structures including some components of the electronic device 300 (e.g., the display, the conductive support member, the printed circuit boards, the board support member, the antenna structure, and at least one insulating member) have been described above with reference to FIGS. 4, 5, 6, 7, 8 and 9. However, the components described above with reference to FIGS. 1, 2 and 3 may be added to the electronic device 300 described above with reference to FIGS. 4, 5, 6, 7, 8 and 9, or a structure in which at least some of the components described above with reference to FIGS. 1, 2 and 3 are removed (e.g., a structure in which a board support member is disposed on one printed circuit board and the board support member is disposed adjacent to an antenna structure and is coupled with a conductive support member through a fixing member) may be applied.

According to various example embodiments described above, an electronic device according to an embodiment may include: a display, an antenna structure including at least one antenna, a conductive support disposed between the display and the antenna structure, a sensor disposed between the display and the conductive support, a first printed circuit board disposed between the conductive support and the antenna structure, a second printed circuit board stacked on the first printed circuit board, a board support coupled with the conductive support and covering at least part of the second printed circuit board, and a first insulating member including an insulating material disposed between the board support and the antenna structure.

According to various example embodiments, the first insulating member may be larger than an area where the antenna structure and the board support overlap each other.

According to various example embodiments, the electronic device may further include a second insulating member including an insulating material disposed between the board support and the first printed circuit board.

According to various example embodiments, the board support may include a cover portion surrounding the second printed circuit board and a flange portion at a periphery of the cover portion, the flange portion having a predetermined width.

According to various example embodiments, the electronic device may further include a fixing member fixing the board support to the conductive support through the flange portion of the board support.

According to various example embodiments, the flange portion may include at least one coupling hole through which the fixing member passes.

According to various example embodiments, the first printed circuit board may include at least one through-hole in which at least part of the fixing member is disposed and disposed at a position corresponding to the coupling hole.

According to various example embodiments, the fixing member may include at least one screw, at least part of which is disposed in the coupling hole and the through-hole, the screw being coupled to the conductive support.

According to various example embodiments, the conductive support may include at least one coupling area having a thread coupled with the fixing member.

According to various example embodiments, part of the fixing member may have a diameter smaller than a diameter of the coupling hole and the through-hole.

According to various example embodiments, the fixing member may comprise a non-conductive material.

According to various example embodiments, the electronic device may further include a third insulating member including an insulating material disposed between the flange portion of the board support and the fixing member.

According to various example embodiments, the conductive support may include a coupling area coupled with the fixing member, and the coupling area may comprise a non-conductive material.

According to various example embodiments, at least part of the board support may be electrically connected with a ground area of the first printed circuit board.

According to various example embodiments, at least part of the board support may make physical contact with a copper-foil-removed area of the first printed circuit board.

According to various example embodiments, the first insulating member may have a thickness in a range of 15 μm or more, or in a range of 60 μm or more.

According to various example embodiments, the sensor may include a sensing part configured to collect a sensor signal, a wiring part configured to transfer the collected sensor signal, and a shielding part configured to shield the wiring part.

According to various example embodiments, the sensor may include a sensing part configured to collect a sensor signal, a wiring part configured to transfer the collected sensor signal, and a conductive tape disposed on the wiring part.

According to various example embodiments, the sensor may include a fingerprint sensor.

According to various example embodiments, the electronic device may further include an interposer disposed between the first printed circuit board and the second printed circuit board.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The electronic device including the sensor according to the various embodiments may interrupt at least part of a path along which noise generated in the electronic device is transferred to the sensor, thereby enabling the sensor to collect normal signals.

While the disclosure has been illustrated and described with reference to various example embodiments thereof, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
    a display;
    an antenna structure comprising at least one antenna;
    a conductive support disposed between the display and the antenna structure;
    a sensor disposed between the display and the conductive support;
    a first printed circuit board disposed between the conductive support and the antenna structure;

a second printed circuit board stacked on a side of the first printed circuit board facing the antenna structure;

a board support coupled with the conductive support and overlapping at least part of the second printed circuit board and a portion of the first printed circuit board on which the second printed circuit board is stacked; and a first insulating member comprising an insulating material disposed between at least the board support and the antenna structure and contacting a surface of the board support and a surface of the antenna structure.

2. The electronic device of claim 1, wherein the first insulating member is equal to or larger than an area where the antenna structure and the board support overlap each other when viewed from above the display in a direction toward the antenna structure.

3. The electronic device of claim 1, further comprising:
a second insulating member comprising an insulating material disposed between the board support and the first printed circuit board.

4. The electronic device of claim 1, wherein the board support includes:
a cover portion surrounding the second printed circuit board; and
a flange portion at a periphery of the cover portion, the flange portion having a predetermined width.

5. The electronic device of claim 4, further comprising:
a fixing member configured to fix the board support to one side of the conductive support through the flange portion of the board support.

6. The electronic device of claim 5, wherein the flange portion includes at least one coupling hole through which the fixing member passes and in which at least part of the fixing member is disposed.

7. The electronic device of claim 6, wherein the first printed circuit board includes at least one through-hole in which at least part of the fixing member is disposed and the through-hole is disposed at a position corresponding to the coupling hole.

8. The electronic device of claim 7, wherein the fixing member includes at least one screw, at least part of which is disposed in the coupling hole and the through-hole, the screw being coupled to the conductive support.

9. The electronic device of claim 8, wherein the conductive support includes at least one coupling area coupled with the fixing member and having a thread formed on at least one side thereof.

10. The electronic device of claim 7, wherein part of the fixing member has a smaller diameter than a diameter of at least one of the coupling hole or the through-hole.

11. The electronic device of claim 5, wherein the fixing member comprises a non-conductive material.

12. The electronic device of claim 5, further comprising:
a third insulating member comprising an insulating material disposed between the flange portion of the board support and the fixing member.

13. The electronic device of claim 5, wherein the conductive support includes a coupling area coupled with the fixing member.

14. The electronic device of claim 13, wherein the coupling area comprises a non-conductive material.

15. The electronic device of claim 1, wherein at least part of the board support is electrically connected with a ground area of the first printed circuit board.

16. The electronic device of claim 1, wherein the first printed circuit comprises a copper foil and at least part of the board support is in physical contact with an area of the first printed circuit board from which copper foil is removed.

17. The electronic device of claim 1, wherein the sensor includes:
a sensing part configured to collect a sensor signal;
a wiring part configured to transfer the collected sensor signal; and
a shielding part configured to shield the wiring part.

18. The electronic device of claim 1, wherein the sensor includes:
a sensing part configured to collect a sensor signal;
a wiring part configured to transfer the collected sensor signal; and
a conductive tape disposed on the wiring part.

19. The electronic device of claim 1, wherein the sensor includes a fingerprint sensor.

20. An electronic device comprising:
a display;
an antenna structure comprising at least one antenna;
a conductive support disposed between the display and the antenna structure;
a sensor disposed between the display and the conductive support;
a first printed circuit board disposed between the conductive support and the antenna structure;
a second printed circuit board stacked on a side of the first printed circuit board facing the antenna structure;
a board support coupled with the conductive support and overlapping at least part of the second printed circuit board and a portion of the first printed circuit board on which the second printed circuit board is stacked; and
a first insulating member comprising an insulating material disposed between at least the board support and the antenna structure and contacting a surface of the board support and a surface of the antenna structure,
when viewed from a front of the display, wherein the conductive support, the board support, the first insulating member and the antenna structure are sequentially stacked.

* * * * *